April 29, 1958 C. D. MORRILL 2,832,886

ELECTRONIC FUNCTION GENERATOR

Filed April 6, 1953

INVENTOR.
CHARLES D. MORRILL

BY

A. H. Oldham
ATTORNEY

United States Patent Office 2,832,886

Patented Apr. 29, 1958

2,832,886

ELECTRONIC FUNCTION GENERATOR

Charles D. Morrill, Cuyahoga Falls, Ohio, assignor to Goodyear Aircraft Corporation, Akron, Ohio, a corporation of Delaware Application April 6, 1953, Serial No. 346,891

5 Claims. (Cl. 250—27)

This invention relates to electronic means useful in an electronic analog computer or an electronic differential analyzer, for electrically simulating various types of mathematical functions.

It is the general object of this invention to generate, by relatively simple, inexpensive, and durable electrical means, various types of functions in a form such that they may be introduced into analog computers or differential analyzers.

Another object of this invention is to provide apparatus for effecting the conversion of an electrical input waveform to an electrical output waveform such that the latter represents the absolute value of the former.

Still another object is to provide electrical means for effecting the duplication, electrically, of desired complex functions by producing, utilizing, or modifying simple and readily obtained electrical waveforms.

The foregoing objects, and other objects of the invention which will become apparent as the description proceeds, are achieved broadly by the addition of the electrical input waveform and a dependently-controlled waveform in a direct-coupled negative feedback summing amplifier, the resulting waveform being such that it represents the absolute value of the original input waveform. More specifically, the original electrical input waveform is coupled to the input of an amplifier having two feedback paths incorporating electrical means such that the output of the amplifier and its associated feedback paths are related to the original input waveform in such manner that when added, the result is a waveform representing the absolute value of the original input waveform. By providing for other waveform inputs at appropriate points in the circuit, various types of complex electrical waveforms representing desired mathematical relationships can be produced at the output.

For a better understanding of the invention, reference should be made to the accompanying drawings, wherein.

Figure 2:
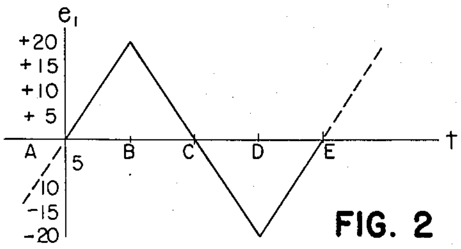
Fig. 2 is a graphical representation of a type of electrical input waveform.
Figure 5:
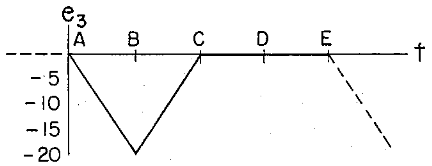
Figure 6:
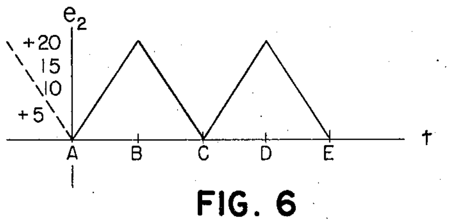
Figure 7:
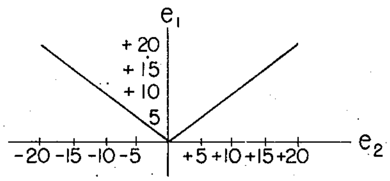

Figs. 3 to 6 inclusive are graphical representations of the modified waveform which when combined with the original input waveform of Fig. 2 produce the output waveform; and Fig. 7 is a graphical representation of the overall relationships between the input and output potentials.

With specific reference to the form of the invention illustrated in the accompanying drawings, in Fig. 1 input terminals 1, connected to the input potential $e_1$, are coupled through a resistor 2 to an amplifier 4, hereinafter referred to as the summing amplifier, and are also coupled through a resistor 6 to an amplifier 12.

Two feedback paths are used in conjunction with the amplifier 12. In one feedback path the output of the amplifier 12 is coupled through a resistor 8 and a diode 9 to the input of said amplifier; one end of the resistor 8 being connected to the output of the amplifier 12 and the other end to the plate of the diode 9, the cathode of the diode 9 being connected to the input of the amplifier 12, the plate of the diode 9 also being connected, through a resistor 7, to terminal 13 whereat a negative direct-current potential is applied.

In the other feedback path, the output of the amplifier 12 is connected, through a diode 10 and a resistor 11, to the input of the amplifier 12; the output of the amplifier 12 being connected to the cathode of the diode 10, and the plate of the diode 10 being connected to one end of the resistor 11, the other end of the said resistor 11 being connected to the input of the amplifier 12.

The input of the amplifier 4 is coupled through a resistor 3 to the plate of the diode 10. The amplifier 4, with a feedback resistor 14, has at its input the original waveform input passing through the resistor 2 from the input terminals 1 and the modified waveform passing through the resistor 3. These two inputs are added in the summing amplifier 4 and the sum reversed in sign, the resultant waveform or output potential $e_2$ being present at output terminals 5.

Figure 3:
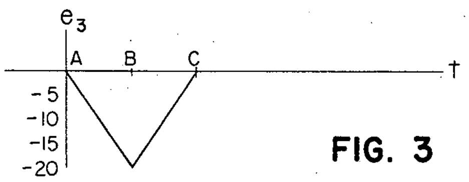

The action of the function generator can best be understood when described for a specific example as shown in Figures 2 through 7 inclusive. The magnitudes of the waveforms shown in these figures are selected only for ease of description and therefore are not designated herein dimensionally in physical units. It is assumed, therefore, for purposes of illustration, that the input potential $e_1$ at the input terminals varies with time $t$ as shown in the waveform diagram in Fig. 2. This waveform is a simple, linearly-varying, alternating-polarity type of electrical potential. Fig. 3 shows the variation of the input $e_3$ to the resistor 3 with the change in the input $e_1$ to the terminals 1 (comprising also the input to the resistor 6). The input $e_3$ is shown for the period of time represented by the distance from A to C in Fig. 2. When the potential $e_1$ at the input to the resistor 6 is positive in sign, the output of the amplifier 12 is negative in sign due to the sign-changing property of the amplifier 12. Thus, the cathode of diode 10 is negative in sign and the diode 10 conducts throughout the waveform time period from A to C. As $e_1$ changes from 0 to +20 to 0, $e_3$ varies from 0 to —20 to 0, respectively. Due to the negative sign of the output of the amplifier 12 and the imposed direct-current negative-potential at terminal 13, the plate of diode 9 is negative in polarity and thus diode 9 is non-conducting. The feedback path, during the period from A to C, for the amplifier 12 is through the conducting diode 10 and the resistor 11.

Figure 4:
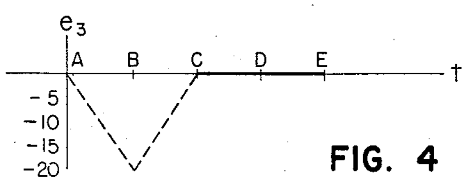

Starting at C and extending to E, the variation in $e_3$ with the change in $e_1$ is shown in Fig. 4. Between C and E of Fig. 2, $e_1$ varies from 0 to —20 to 0. When the input potential to the resistor 6 is negative in sign, the output potential from the amplifier 12 is positive in sign. Resistors 7 and 8 and the direct-current potential applied at terminal 13 are so chosen that, in order for diode 9 to conduct, the output of the amplifier 12 must be sufficiently positive to prevent diode 10 from conducting. The purpose of this arrangement is to prevent the diode 9 from conducting at values of $e_1$ equal to or greater than zero, and to eliminate any conduction due to initial electron velocities at the cathode of the said diode.

The resulting $e_3$ waveform from A to E, due to the action described above, and present at the input to the resistor 3, is shown in Fig. 5.

Assuming that the magnitudes of the resistors 2 and 3 are such that the resistor 3 is one-half the value of the resistor 2, the waveform present at the output of resistor 3 has a peak value of twice that of the waveform present at the output of the resistor 2 and is of the opposite sign between A and C. Consequently when these two waveforms are added and reversed in sign by the amplifier 4, the resultant waveform shown in Fig. 6 is present at the output terminals 5.

If the input potential $e_1$ is now compared graphically to the output potential $e_2$, the resultant relationship is as shown in Fig. 7. This relationship can be utilized to express a mathematical function; in the above example we would have a function consisting of the equations:

$$y=X \text{ for } 0\leqq X\leqq +20$$

$$y=-X \text{ for } -20\leqq X\leqq 0$$

Or i. e.

$$e_2=|e_1|$$

Figure 1:
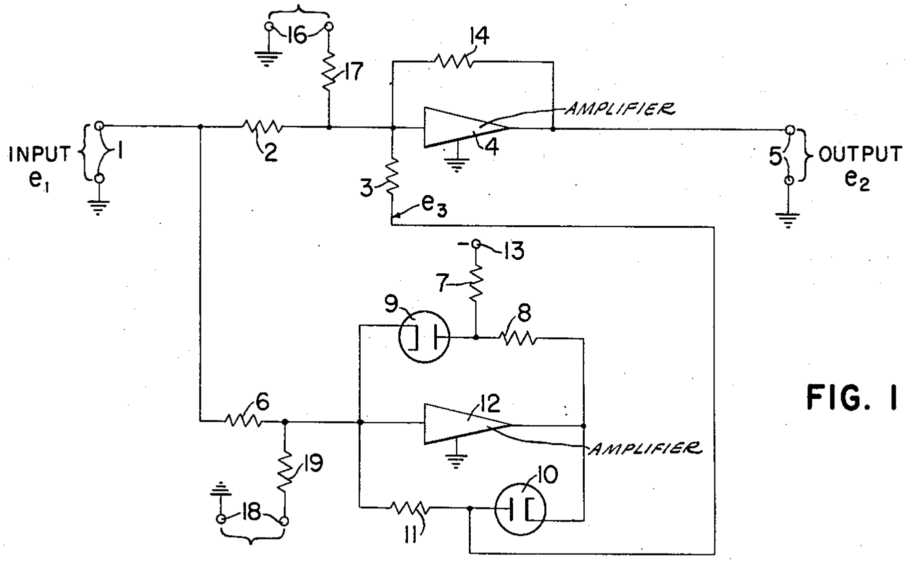
Fig. 1 is a schematic diagram of a preferred circuit embodiment of the invention.

Other mathematical functions can be generated by introducing various waveforms or potentials at appropriate points in the circuit of Fig. 1. For example, the introduction of a suitable potential at terminals 16 through a resistor 17 into the input of the amplifier 4 can alter the relationships of Fig. 7 in such manner as to translate the function shown symmetrically along the abscissa of the axes a desired amount. Likewise, a translation of the function shown in Fig. 7 symmetrically along the ordinate of the axes a desired amount can be achieved by the introduction of a suitable potential at terminals 18 through a resistor 19 into the input of the amplifier 12. A change in the ratio of the resistors 2 and 3 results in a limited amount of rotation of the function. Considerable flexibility is readily apparent when combinations of the above translations and rotations are considered.

The device may be compounded, thus permitting the generating of various and many complex mathematical functions with the usage of only simple and easily available waveforms.

While certain representative embodiments and details have been shown for the purpose of illustrating the invention, it will be apparent to those skilled in this art that various changes and modifications may be made therein without departing from the spirit or scope of the invention.

I claim:

1. Electronic means for generating functions comprising, a direct-coupled negative-feedback summing amplifier, input terminals coupled to the summing amplifier input, a second amplifier the input of which is also coupled to the input terminals, a first feedback arrangement on the second amplifier incorporating a diode and a feedback resistor with a negative direct-current potential coupled to the plate of the diode, the plate of the diode being connected through the feedback resistor to the output of said amplifier and the cathode of said diode being connected to the input of said amplifier, a second feedback arrangement on the second amplifier incorporating a diode and a feedback resistor with the plate of the diode coupled to the input of the summing amplifier through the feedback resistor, the cathode of the diode being connected to the output of the second amplifier, the first feedback arrangement only conducting when the input to the second amplifier is negative in sign and the second feedback arrangement only conducting when the input to said amplifier is positive in sign, output terminals coupled to the output of the summing amplifier, a second set of input terminals coupled to the input of the summing amplifier whereat a modifying variable may be introduced, and input terminals coupled to the input of the second amplifier whereat a modifying variable may be introduced.

2. Electronic means for generating functions comprising, summing circuit means, input terminals coupled to the input of the summing circuit means, amplifying circuit means the input of which is also coupled to the input terminals, a first feedback arrangement on the amplifying circuit means incorporating a diode and a feedback resistor with a negative direct-current potential coupled to the plate of the diode, the plate of the diode being connected through the feedback resistor to the output of said amplifying means and the cathode of said diode being connected to the input of the amplifying means, a second feedback arrangement on the amplifying means incorporating a diode and a feedback resistor with the plate of the diode coupled to the input of the summing circuit means through the feedback resistor, the cathode of the diode being connected to the output of the amplifying means, the first feedback arrangement only conducting when the input to the amplifying means is negative in sign and the second feedback arrangement only conducting when the input to said amplifying means is positive in sign, output terminals coupled to the output of the summing circuit means, a second set of input terminals coupled to the input of the summing circuit means whereat a modifying variable may be introduced, and input terminals coupled to the input of the amplifying circuit means whereat a modifying variable may be introduced.

3. Electronic means for generating functions comprising, summing circuit means, input terminals coupled to the input of the summing circuit means, amplifying circuit means the input of which is also coupled to the input terminals, a first feedback arrangement on the amplifying means incorporating a diode and a feedback resistor with a negative direct-current potential coupled to the plate of the diode, a second feedback arrangement on the amplifying means incorporating a diode and a feedback resistor with the plate of the diode coupled to the input of the summing means, the first feedback arrangement only conducting when the input to the amplifying means is negative in sign and the second feedback arrangement only conducting when the input to said amplifying means is positive in sign, output terminals coupled to the output of the summing circuit means, a second set of input terminals coupled to the input of the summing circuit means whereat a modifying variable may be introduced, and input terminals coupled to the input of the amplifying circuit means whereat a modifying variable may be introduced.

4. A function generator comprising a high gain negative feedback D.-C. amplifier, a thermionic diode having a cathode element connected to the output of said amplifier, a second thermionic diode having an anode element connected to the output of said amplifier through one resistive branch of a voltage divider, the other branch of the voltage divider being connected to a constant negative voltage source, the remaining elements of said diodes being connected to the input of said amplifier, there being an anode resistor in series with the anode of the said first diode, and an input resistor connected to the input of said amplifier, said anode resistor and input resistor and said negative voltage source being proportioned to provide at the output terminals of said generator a voltage precisely proportional to the input voltage when the input voltage is negative and precisely zero when the input voltage is positive.

5. A function generator comprising a high gain negative feedback D.-C. amplifier, a thermionic diode having an anode element connected to the output of said amplifier, a second thermionic diode having a cathode element connected to the output of said amplifier, one of said elements being connected to said output through one resistive branch of a voltage divider, the other branch of said divider being connected to a constant potential source, the remaining elements of said diodes being connected to the input of said amplifier, there being a resistor in series with one of the elements of one diode which connects it to said input and an input resistor connected to the input of said amplifier, said resistors and said constant voltage source being proportioned to provide at the output terminals of said generator a voltage precisely proportional to the input voltage when the input voltage is of one sign and precisely zero when the input voltage is of the opposite sign, a voltage divider shunted across the input of said amplifier and the element of the diode to which said resistor is in series, said voltage divider comprising resistors connected in series, and a summing amplifier having its input connected to said voltage divider at an intermediate position therealong.

References Cited in the file of this patent

UNITED STATES PATENTS

| | | |
|---|---|---|
| 2,125,982 | Belleville | Aug. 9, 1938 |
| 2,421,138 | Wheeler | May 27, 1947 |
| 2,429,227 | Herbst | Oct. 21, 1947 |
| 2,548,449 | Staub | Apr. 10, 1951 |
| 2,636,080 | Doba | Apr. 21, 1953 |
| 2,651,717 | Urley et al. | Sept. 8, 1953 |
| 2,683,806 | Moody | July 13, 1954 |